(12) United States Patent
Horth

(10) Patent No.: US 9,961,838 B2
(45) Date of Patent: May 8, 2018

(54) LAWN DEBRIS COLLECTION ASSEMBLY

(71) Applicant: Corey Andri Horth, Niagara Falls (CA)

(72) Inventor: Corey Andri Horth, Niagara Falls (CA)

( * ) Notice: Subject to any disclaimer, the term of this patent is extended or adjusted under 35 U.S.C. 154(b) by 332 days.

(21) Appl. No.: 14/948,732

(22) Filed: Nov. 23, 2015

(65) Prior Publication Data

US 2017/0142907 A1 May 25, 2017

(51) Int. Cl.
*A47L 5/14* (2006.01)
*A01G 1/12* (2006.01)
*A47L 9/14* (2006.01)

(52) U.S. Cl.
CPC ............. *A01G 1/125* (2013.01); *A01G 20/43* (2018.02); *A47L 5/14* (2013.01); *A47L 9/14* (2013.01)

(58) Field of Classification Search
CPC .. A47L 5/14; A47L 9/14; A01G 1/125; A01G 20/43
See application file for complete search history.

(56) References Cited

U.S. PATENT DOCUMENTS

| | | | |
|---|---|---|---|
| 5,048,275 A * | 9/1991 | Fassauer | A01D 34/695 15/345 |
| 5,054,159 A | 10/1991 | Richardson | |
| 5,119,619 A | 6/1992 | Zappia | |
| 5,210,996 A * | 5/1993 | Fassauer | A01D 34/695 15/327.3 |
| 5,259,175 A | 11/1993 | Schmidt | |
| 5,275,858 A | 1/1994 | Hock | |
| 5,280,667 A * | 1/1994 | Coathupe | A01G 1/125 15/345 |
| 5,392,492 A * | 2/1995 | Fassauer | A47L 5/10 15/327.3 |
| 5,584,095 A | 12/1996 | Redding et al. | |
| 5,749,209 A | 5/1998 | Thomason | |
| 6,055,703 A | 5/2000 | Redding et al. | |
| 6,280,532 B1 | 8/2001 | Allen | |
| 6,308,505 B1 | 10/2001 | Beckett | |

(Continued)

OTHER PUBLICATIONS

Black & Decker 12-amp Blower Vacuum, retrieved from http://www.walmart.com/ip/Black-Decker-12-amp-Blower-Vacuum/19581042, on Oct. 31, 2015.

(Continued)

*Primary Examiner* — David Redding

(57) ABSTRACT

Apparatus includes a lawn debris collection assembly having a plenum assembly configured to be positioned in close proximate relationship with a lawn surface having lawn debris lodged between lawn blades of a lawn. The plenum assembly is movable along the lawn surface. The plenum assembly is also configured to house a positive air-pressure stream in such a way that the positive air-pressure stream is directed toward the lawn debris, and the positive air-pressure stream, in use, dislodges the lawn debris from between the lawn blades. The plenum assembly is also configured to house a negative air-pressure airstream in such a way that the negative air-pressure airstream, in use, flows from the plenum assembly to a debris-collection bag. The negative air-pressure airstream, in use, urges the lawn debris to move from the plenum assembly to the debris-collection bag.

20 Claims, 15 Drawing Sheets

(56) References Cited

U.S. PATENT DOCUMENTS

| | | | |
|---|---|---|---|
| 6,904,743 B2 | 6/2005 | Vodinh | |
| 7,383,607 B2 * | 6/2008 | Johnson | A47L 9/0461 15/345 |
| 7,401,378 B2 | 7/2008 | Hobbs et al. | |
| 7,441,304 B2 * | 10/2008 | Maier | A01D 51/002 15/320 |
| 7,617,666 B1 | 11/2009 | Marchese | |
| 7,814,615 B1 | 10/2010 | Ries | |
| 7,950,102 B2 | 5/2011 | Lee et al. | |
| 8,151,410 B2 | 4/2012 | Batchelder et al. | |
| 8,739,362 B1 | 6/2014 | Conder | |
| 2002/0162187 A1 * | 11/2002 | Keller | A47L 9/02 15/345 |
| 2006/0236671 A1 | 10/2006 | Summerville et al. | |
| 2009/0064650 A1 * | 3/2009 | Eberle | A01D 34/81 56/14.7 |
| 2009/0071115 A1 | 3/2009 | Freewalt | |
| 2009/0165242 A1 | 7/2009 | Lee et al. | |
| 2009/0205157 A1 * | 8/2009 | Allaway | A47L 9/08 15/345 |
| 2010/0242215 A1 | 9/2010 | Dyson et al. | |
| 2014/0068892 A1 | 3/2014 | Chambers | |

OTHER PUBLICATIONS

Oreck Quest (TM) Compact Canister MC1000 User's Guide, published Apr. 2010.

* cited by examiner

LAWN DEBRIS COLLECTION ASSEMBLY

TECHNICAL FIELD

This document relates to the technical field of (and is not limited to) a lawn debris collection assembly including a plenum assembly configured to be positioned in close proximate relationship with a lawn surface.

BACKGROUND

The leaf blower was developed in the 1950s, and was introduced as part of an agricultural chemical sprayer. After introducing the leaf blower to the market, manufacturers discovered that many consumers were removing the chemical dispensing parts from the leaf blower, leaving only the blower section behind. Since then, manufacturers identified the potential of the leaf blower as a common lawn and garden maintenance tool. The leaf blower (referred to as a blower) is a gardening tool configured to propel air (an airstream) from a nozzle to move (blow) debris (such as, leaves and grass cuttings, etc.) from a lawn. Leaf blowers are powered by electric or gasoline motors, and are self-contained handheld units, backpack mounted units with a handheld wand, or walk around units, etc. For instance, larger units may rest on wheels and may use a motor for propulsion; these units of the type called "walk behind leaf blowers" (such as, the TROY-BILT (TRADEMARK) Model number 24A-672J766 Walk Behind Jet Sweep Blower system) because they are pushed by hand to be operated.

For instance, a type of leaf blower is configured to: (A) suck in (that is, take in via a vacuum) lawn debris (that is, leaves and small twigs), and (B) shred the lawn debris, which are then placed in a bag (a debris container). In this configuration, the leaf blower is called a leaf blower/vac system. Examples of the leaf blower/vac system may include any one of: (A) the TORO (TRADEMARK) Model number 51619 Blower/Vacuum system, (B) the STIHL (TRADEMARK) Model number BG 56 Blower/Vacuum system, or (C) the RYOBI (TRADEMARK) Model number RY09056 Blower Vacuum system.

SUMMARY

It will be appreciated that there exists a need to mitigate (at least in part) at least one problem associated with the existing gardening equipment configured to remove lawn debris, such as (and not limited to) the leaf blower/vac systems (also called the existing technology). After much study of the known systems and methods with experimentation, an understanding of the problem and its solution has been identified and is articulated as follows:

The problem with existing technology is that relatively smaller pieces of debris such as, chopped leaves become lodged between the lawn blades (that is, grass blades) of a lawn. Failure to remove this debris in the autumn season may lead to lawn damage over the winter season as evidenced in the early spring season. This leads to lawn repairs in the late spring season. Relatively smaller pieces of debris are relatively difficult to dislodge and remove from between the lawn blades of a lawn (thereby, the debris (lawn debris) requires more time and manual effort to be removed from the lawn). Sometimes, a lawn rake and a leaf blower are used, but this arrangement simply scatters relatively smaller pieces of debris around the lawn (thus requiring usage of more time and effort to remove the lawn debris from the lawn and then to collect the lawn debris in a disposal container).

Therefore, it is now apparent that what is needed is an apparatus for improving debris-collecting efficiency by reducing the time required for collecting lawn debris from lawns, especially for debris that remains stubbornly lodged between the lawn blades of the lawn.

To mitigate, at least in part, at least one problem associated with the existing technology, there is provided (in accordance with a major aspect) an apparatus. The apparatus includes a lawn debris collection assembly having plenum assembly configured to be positioned in close proximate relationship with a lawn surface having lawn debris lodged between lawn blades (that is, grass blades) of a lawn. The plenum assembly is movable along the lawn surface. The plenum assembly is also configured to house a positive air-pressure stream in such a way that the positive air-pressure stream is directed toward the lawn debris, and the positive air-pressure stream, in use dislodges the lawn debris from (away from) between the lawn blades. The plenum assembly is also configured to house a negative air-pressure airstream in such a way that the negative air-pressure airstream (in use) flows from the plenum assembly to a debris-collection bag. The negative air-pressure airstream, in use, urges the lawn debris (that was dislodged) to move from the plenum assembly to the debris-collection bag.

Another problem is solved with the following configuration of the apparatus in which the apparatus includes (and is not limited to) a lawn debris collection assembly, including: a plenum assembly being configured to be positioned in close proximate relationship with a lawn surface having lawn debris lodged between lawn blades (that is, grass blades) of a lawn. The plenum assembly is also configured to house a negative air-pressure airstream in such a way that (A) the negative air-pressure airstream, in use, flows from the plenum assembly to a debris-collection bag, and (B) the negative air-pressure airstream, in use, urges the lawn debris, which was dislodged from between the lawn blades by the positive air-pressure stream, to move from the plenum assembly to the debris-collection bag. The plenum assembly has an instance (at least one or more instances) of a wheel rotatably mounted thereto. The debris-collection bag may be called a collection container, etc. The instances of the wheel are configured to facilitate the rolling movement of the plenum assembly along the lawn surface.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
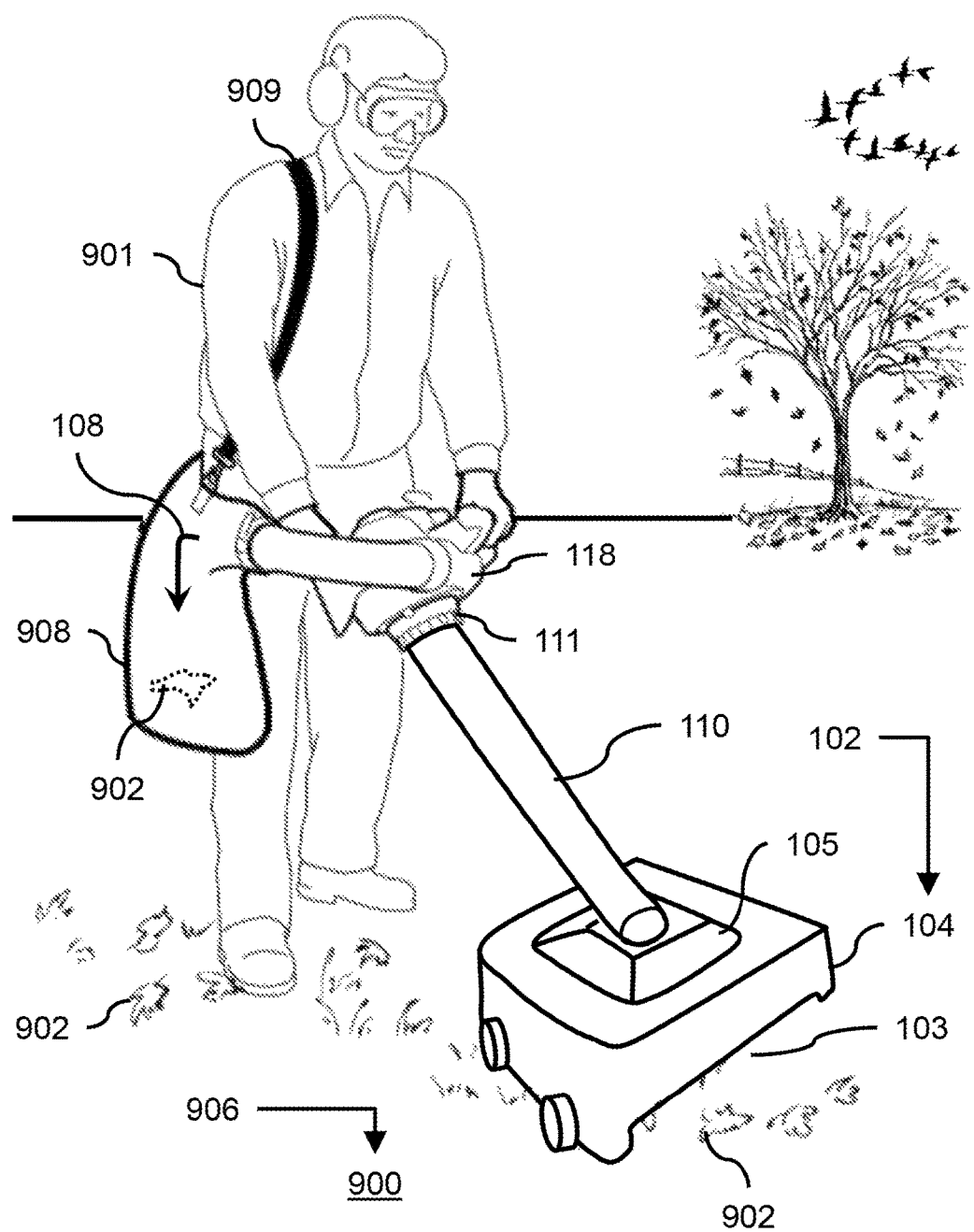
FIG. 1 depicts a perspective front view of an embodiment of an apparatus including a lawn debris collection assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

DETAILED DESCRIPTION OF THE DRAWINGS

Figure 6:
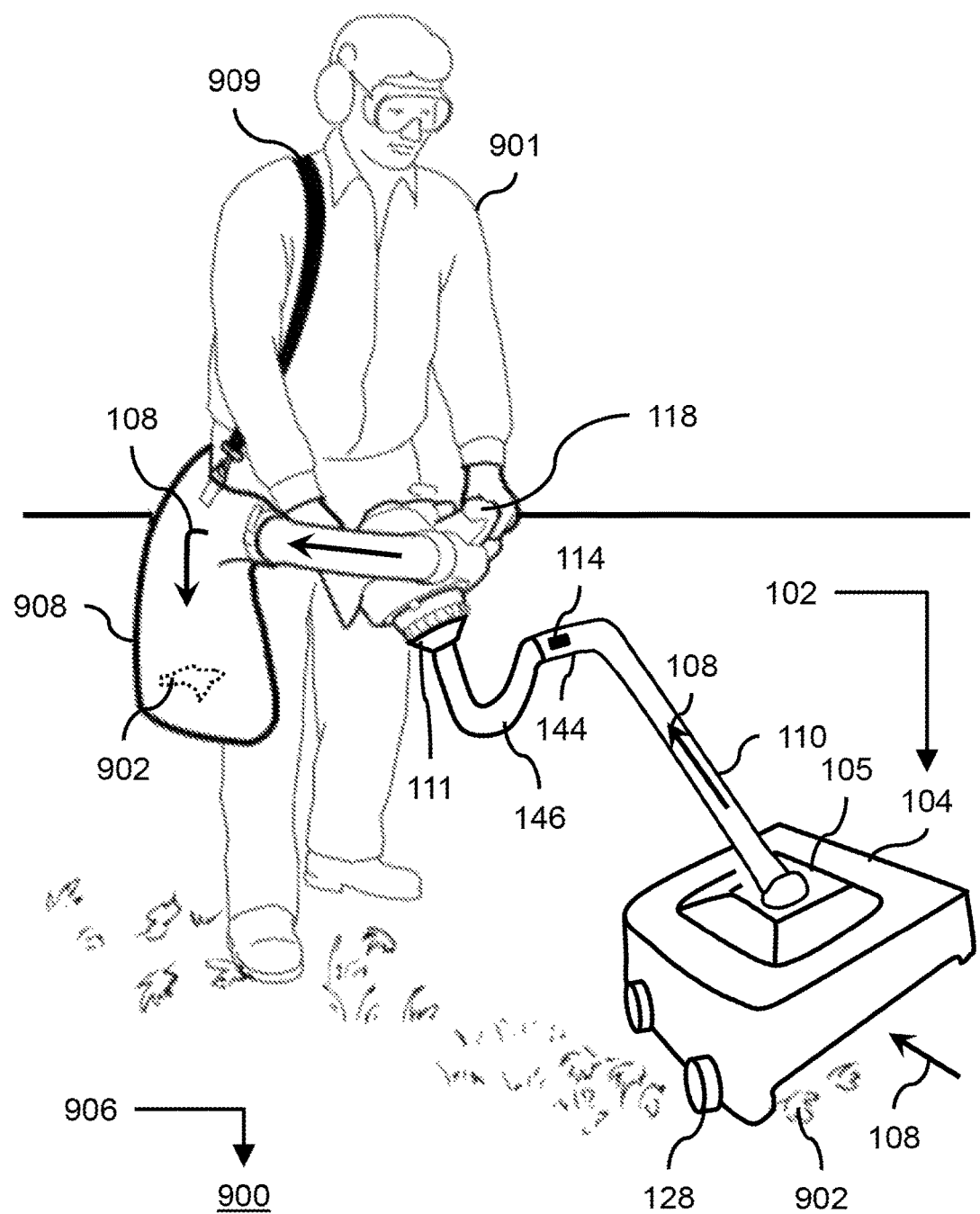
FIG. 6 depicts a front perspective view of an embodiment of the apparatus of FIG. 1.
Figure 7:
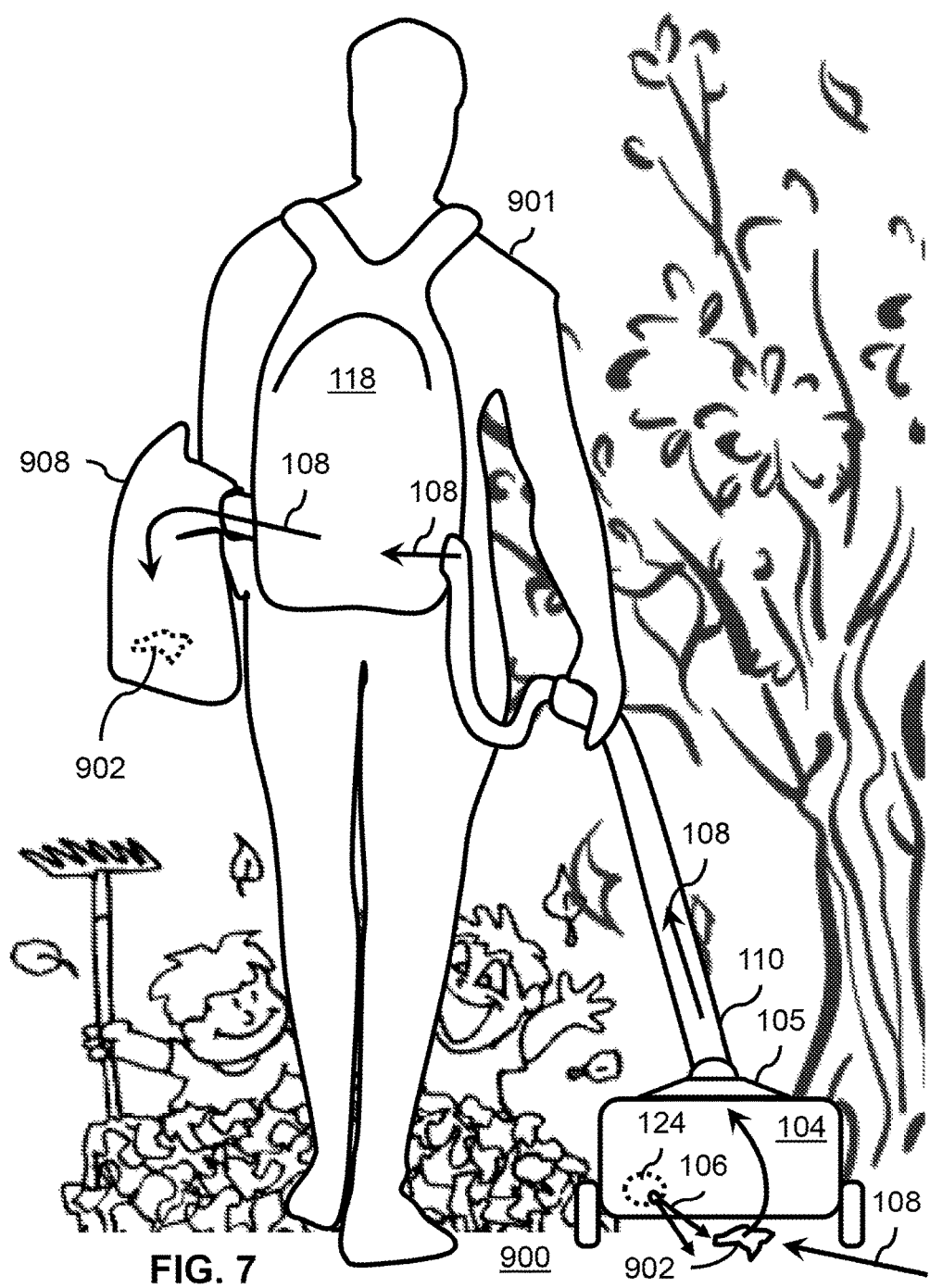
FIG. 7 depicts a rear perspective view of an embodiment of the apparatus of FIG. 1.
Figure 13:
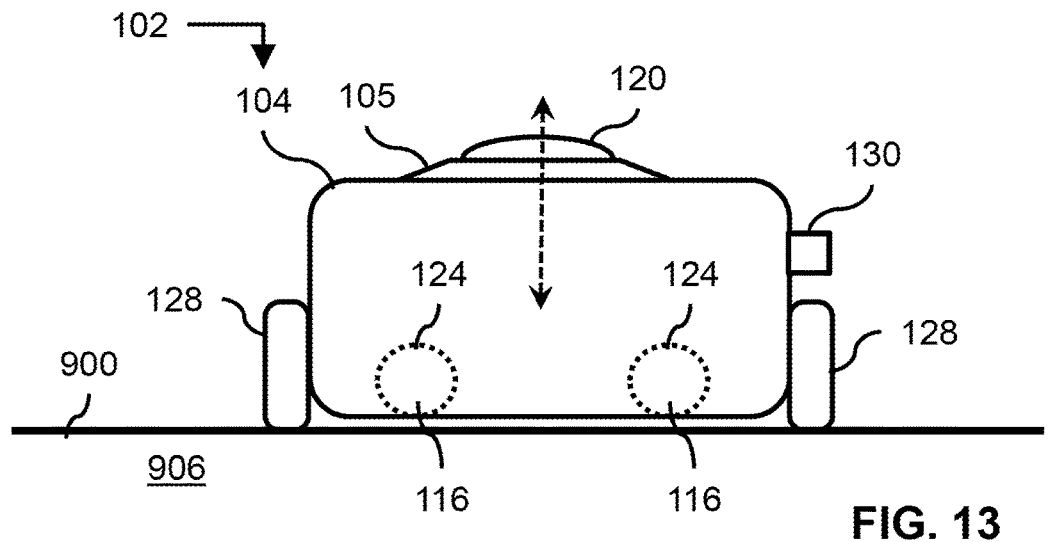
FIG. 13 and FIG. 14 depict rear views of embodiments of the apparatus of FIG. 1.
Figure 14:
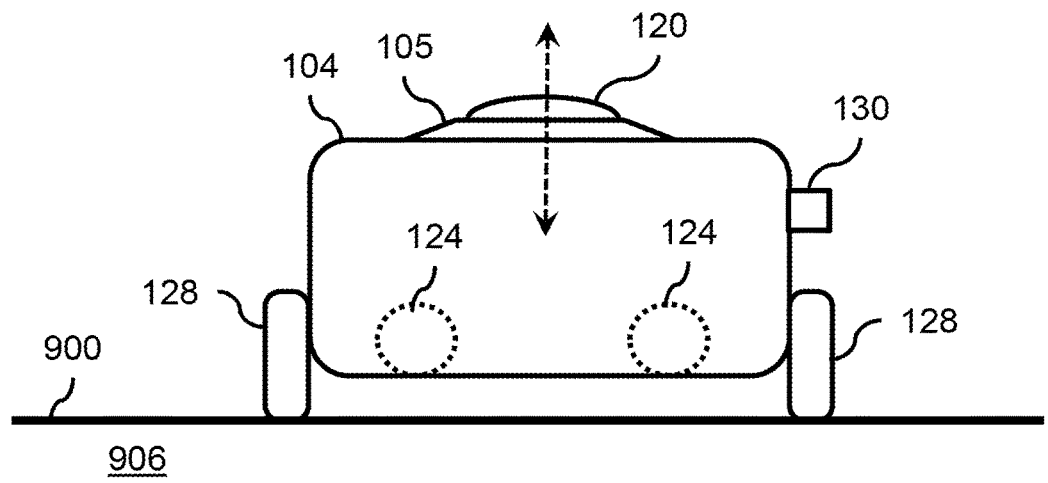
Figure 15:
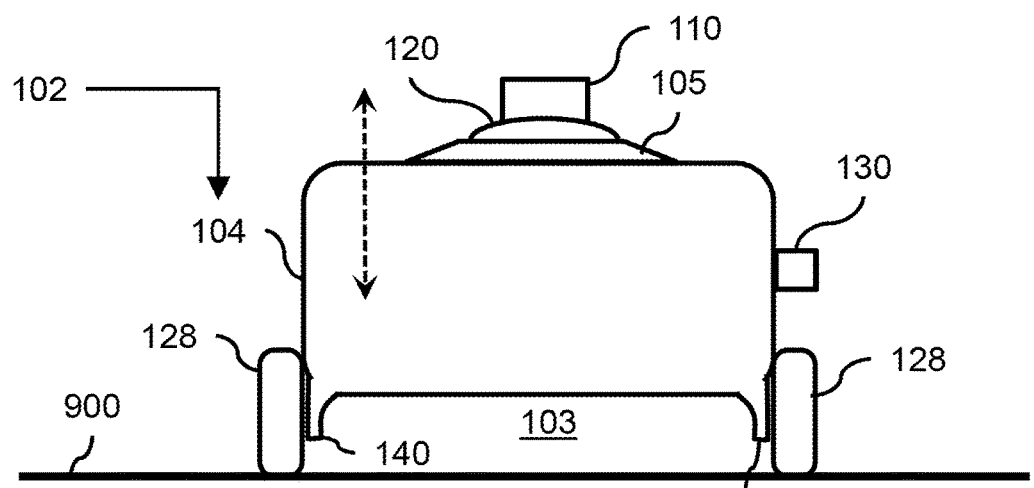
FIG. 15, FIG. 16 and FIG. 17 depict front views of embodiments of the apparatus of FIG. 1.
Figure 16:
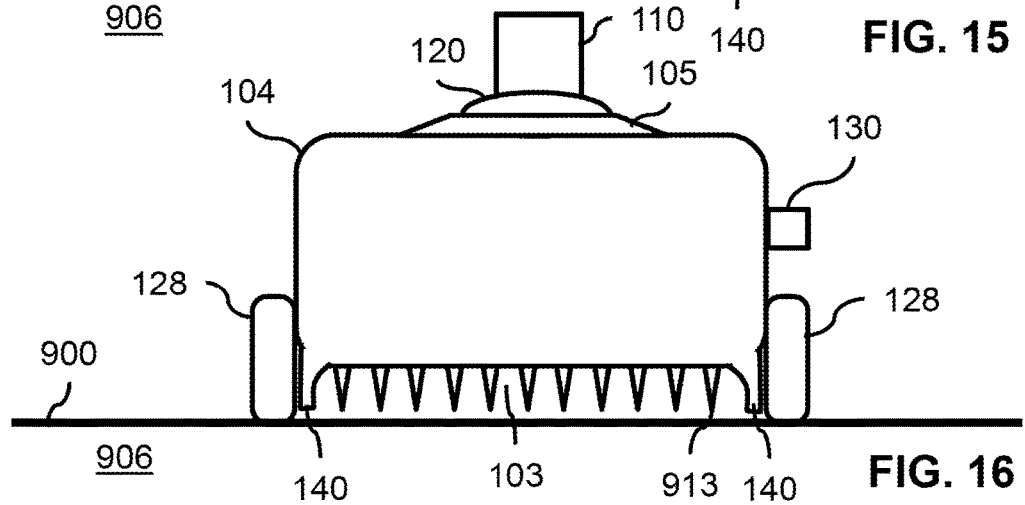
Figure 17:
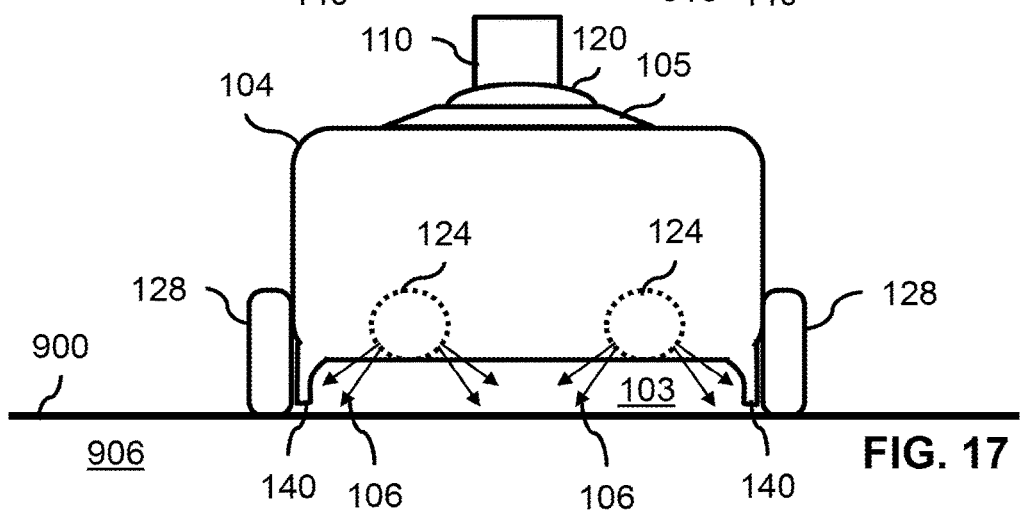
Figure 18:
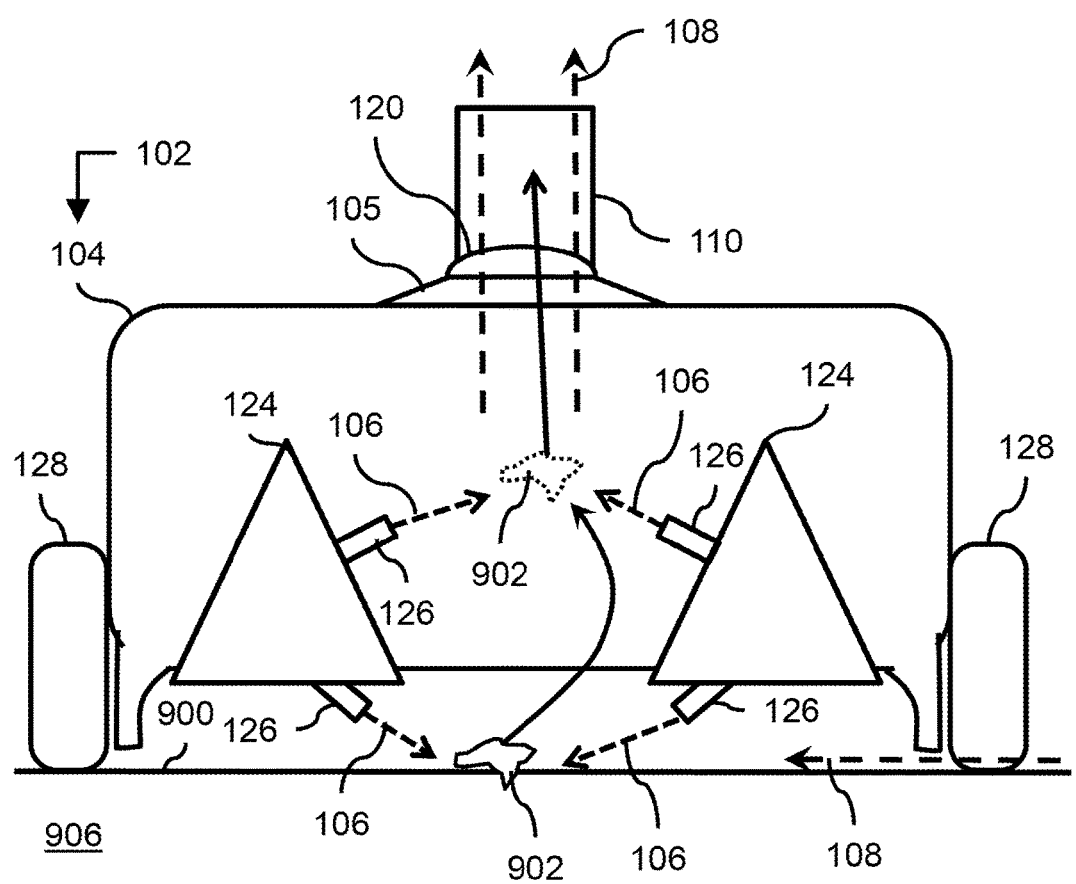
FIG. 18 depicts an internal view of an embodiment of the apparatus of FIG. 1.
Figure 19:
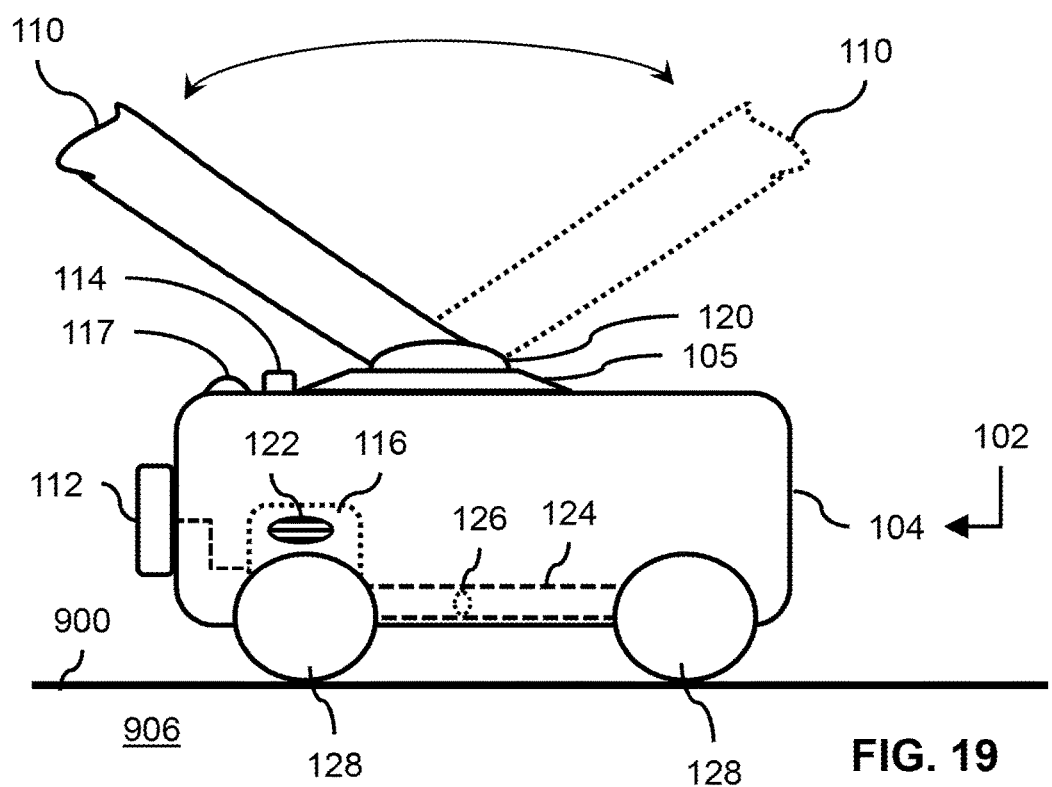
FIG. 19 depicts a side view of an embodiment of the apparatus of FIG. 1.
Figure 20:
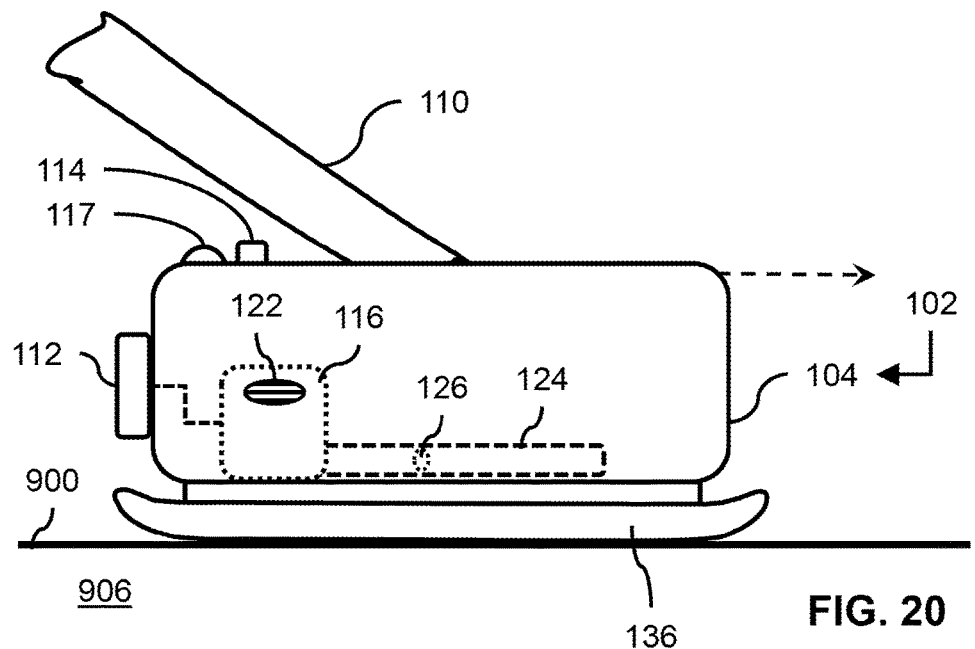
FIG. 20, FIG. 21, FIG. 22 and FIG. 23 depict a side view, a front view, a perspective view and a perspective view (respectively) of embodiments of the apparatus of FIG. 1.

The non-limiting embodiments may be more fully appreciated by reference to the following detailed description of the non-limiting embodiments when taken in conjunction with the accompanying drawings, in which:

FIG. 1 (SHEET 1 OF 15 SHEETS) depicts a perspective front view of an embodiment of an apparatus including a lawn debris collection assembly 102;

FIG. 2, FIG. 3, FIG. 4 and FIG. 5 (SHEETS 2 AND 3 OF 15 SHEETS) depict views of embodiments of the apparatus of FIG. 1;

FIG. 6 (SHEET 4 OF 15 SHEETS) depicts a front perspective view of an embodiment of the apparatus of FIG. 1;

FIG. 7 (SHEET 5 OF 15 SHEETS) depicts a rear perspective view of an embodiment of the apparatus of FIG. 1;

FIG. 8, FIG. 9, FIG. 10, FIG. 11 and FIG. 12 (SHEETS 6 TO 8 OF 15 SHEETS) depict partial frontal perspective views of embodiments of the apparatus of FIG. 1;

FIG. 13 and FIG. 14 (SHEET 9 OF 15 SHEETS) depict rear views of embodiments of the apparatus of FIG. 1;

FIG. 15, FIG. 16 and FIG. 17 (SHEET 10 OF 15 SHEETS) depict front views of embodiments of the apparatus of FIG. 1;

FIG. 18 (SHEET 11 OF 15 SHEETS) depicts an internal view of an embodiment of the apparatus of FIG. 1;

FIG. 19 (SHEET 12 OF 15 SHEETS) depicts a side view of an embodiment of the apparatus of FIG. 1;

FIG. 20, FIG. 21, FIG. 22 and FIG. 23 (SHEETS 13 AND 14 OF 15 SHEETS) depict a side view, a front view, a perspective view and a perspective view (respectively) of embodiments of the apparatus of FIG. 1.

Figure 24:
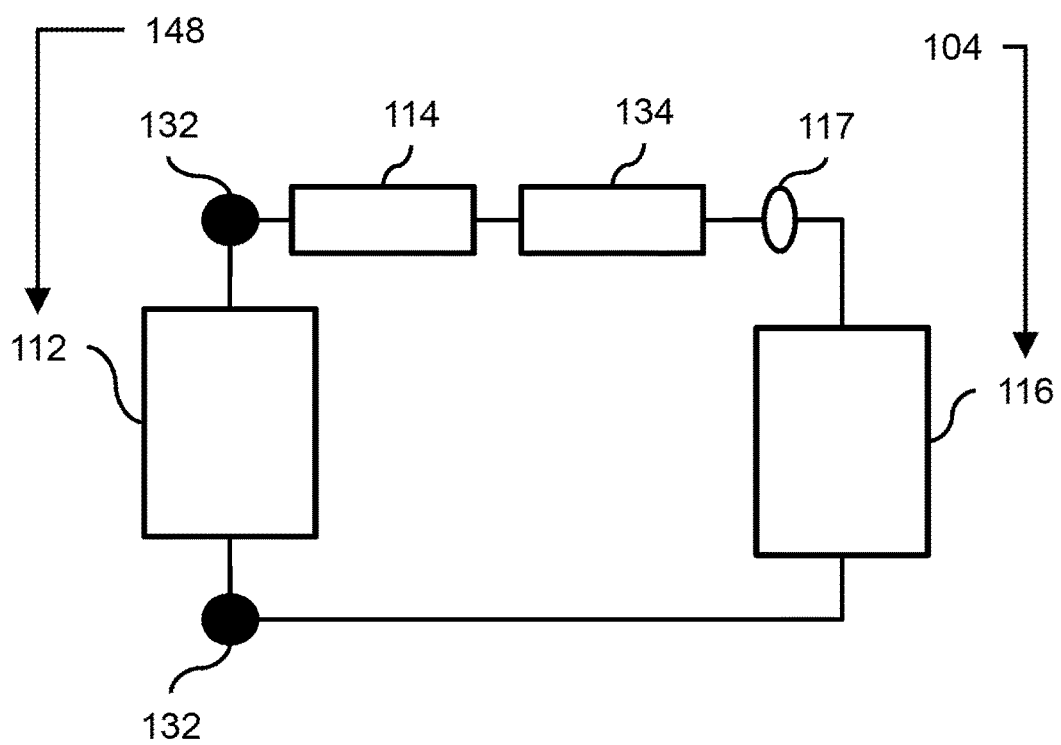
FIG. 24 depicts an electrical schematic of an embodiment of the apparatus of FIG. 1.

FIG. 24 (SHEET 15 OF 15 SHEETS) depicts an electrical schematic of an embodiment of the apparatus of FIG. 1.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 apparatus
102 lawn debris collection assembly
103 debris entrance
104 plenum assembly
105 upper tapered section
106 positive air-pressure stream
108 negative air-pressure airstream
110 wand unit
111 adaptor section
112 electrical power source assembly
114 switch assembly
116 positive pressure generating assembly
117 lamp assembly
118 negative pressure generating assembly
120 swivel connection
122 air intake
124 positive air conduit
126 air jet
128 wheel
130 height-adjustment mechanism
132 electrical terminals
134 fuse assembly
136 slider assembly
138 wand connection assembly
140 skirt assembly
142 fan unit
144 handle portion
146 flexible hose section
148 electrical circuit
900 lawn surface
901 user
902 lawn debris
904 lawn blades
906 lawn
908 debris-collection bag
909 shoulder strap
913 rake profile

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a perspective front view of an embodiment of an apparatus including a lawn debris collection assembly 102.

Referring to the embodiment as depicted in FIG. 1, the lawn debris collection assembly 102 is configured to be selectively connected (selectively coupled) to a negative pressure generating assembly 118 (especially for the case where the negative pressure generating assembly 118 is a pre-existing assembly, and the lawn debris collection assembly 102 is used as a retrofit to the negative pressure generating assembly 118). The negative pressure generating assembly 118 is configured to be selectively connectable to (and dis-connectable from) a debris-collection bag 908 (a debris container). The debris-collection bag 908 includes a shoulder strap 909 configured to be worn by the user 901, etc.

Preferably, the negative pressure generating assembly 118 is configured to generate (at a minimum) a negative air-pressure airstream 108 (that is, create a vacuum for removing or sucking air from, or away from, the lawn surface 900).

In accordance with a preferred option, the negative pressure generating assembly 118 is configured to selectively generate either (A) a negative air-pressure airstream 108 (for removing or sucking air away from the lawn surface 900), or (B) a positive air-pressure stream 106 (for blowing air onto, or at, the lawn surface 900). The negative pressure generating assembly 118 does not (at the same time) generate both the positive air-pressure stream 106 and the negative air-pressure airstream 108.

For the case where the negative pressure generating assembly 118 is to be used with the lawn debris collection assembly 102, the negative pressure generating assembly 118 is set to generate the negative air-pressure airstream 108, and is not used to generate the positive pressure airstream.

For instance, embodiments of the negative pressure generating assembly 118 include any one of: (A) the TORO (TRADEMARK) Model number 51619 Blower/Vacuum system (electric powered; TORO is headquartered in Minnesota, USA), (B) the STIHL (TRADEMARK) Model number BG 56 Blower/Vacuum system (gas powered; STIHL is headquartered in Waiblingen, Germany), or (C) the RYOBI (TRADEMARK) Model number RY09056 Blower Vacuum system (gas powered; RYOBI is headquartered in Hiroshima-ken, Japan), and all are incorporated herein by reference. It will be appreciated that these embodiments of the negative pressure generating assembly 118 are all configured to selectively generate either (A) the negative pressure airstream (for sucking or moving air from or away from, the lawn surface 900), or (B) the positive pressure airstream (for blowing air onto the lawn surface 900).

In accordance with an embodiment, the lawn debris collection assembly 102 may be sold separately (that is, the lawn debris collection assembly 102 is provided separately as a retrofit item) for use with existing instances of the negative pressure generating assembly 118. In accordance with an alternative embodiment, the lawn debris collection assembly 102 is provided with the negative pressure generating assembly 118, in which the user 901 purchases both in a single kit or box from a retailer (if so desired), as manufactured by an original equipment manufacturer (OEM).

Figure 2:
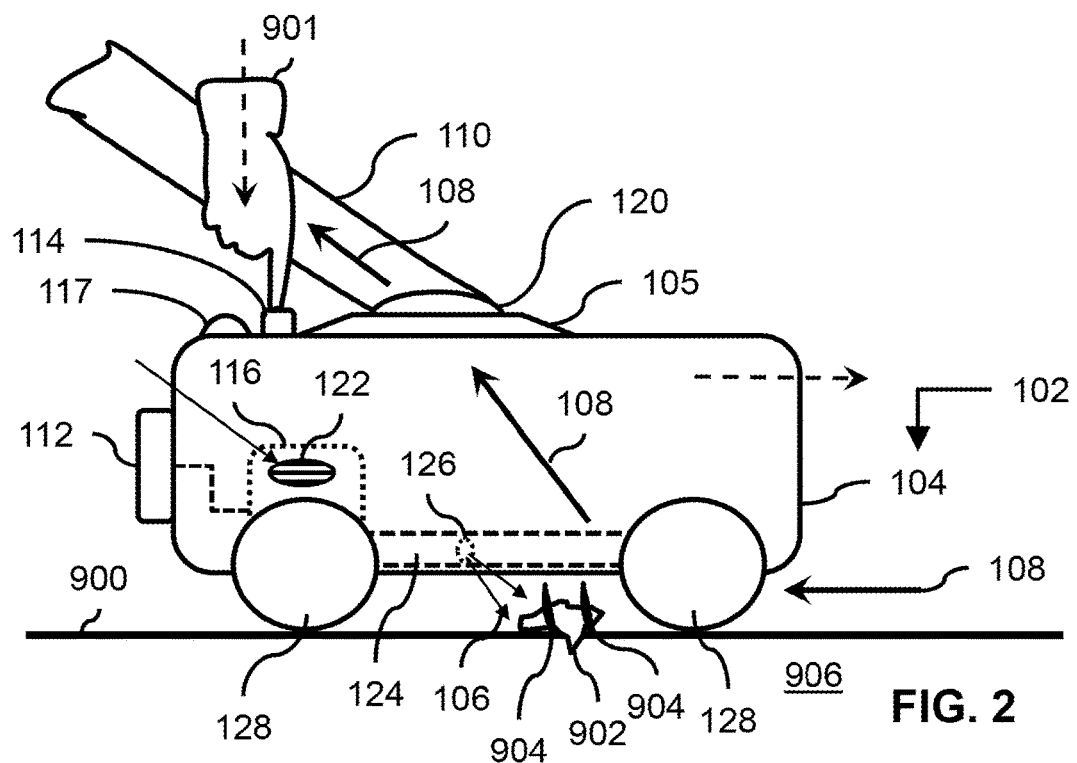
FIG. 2, FIG. 3, FIG. 4 and FIG. 5 depict views of embodiments of the apparatus of FIG. 1.
Figure 3:
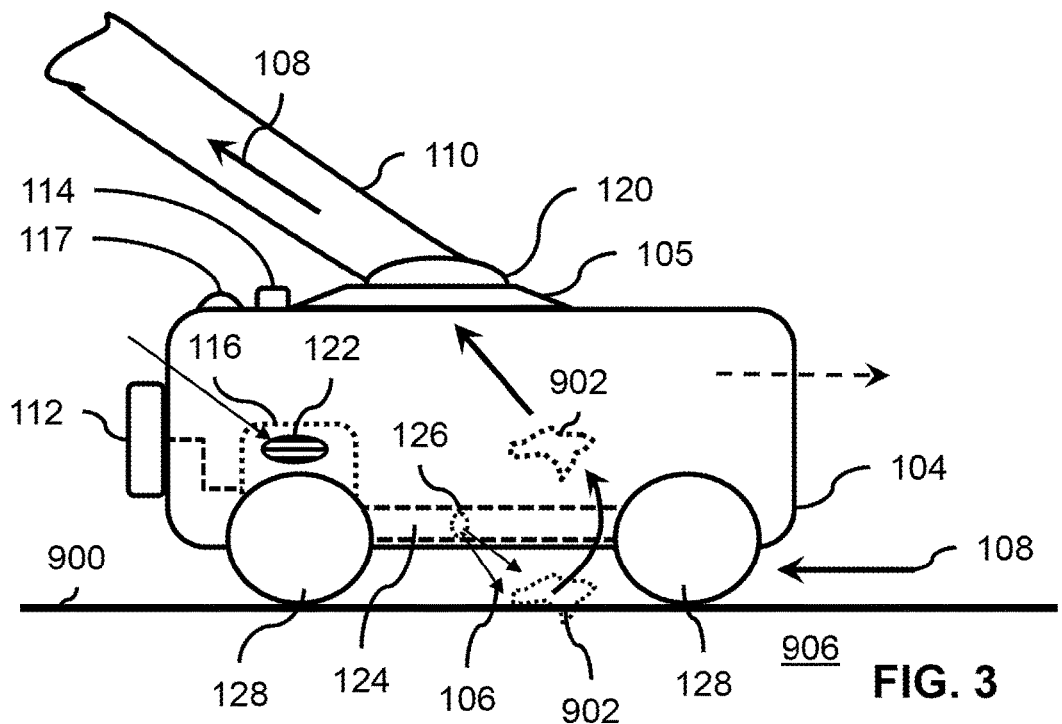
Figure 4:
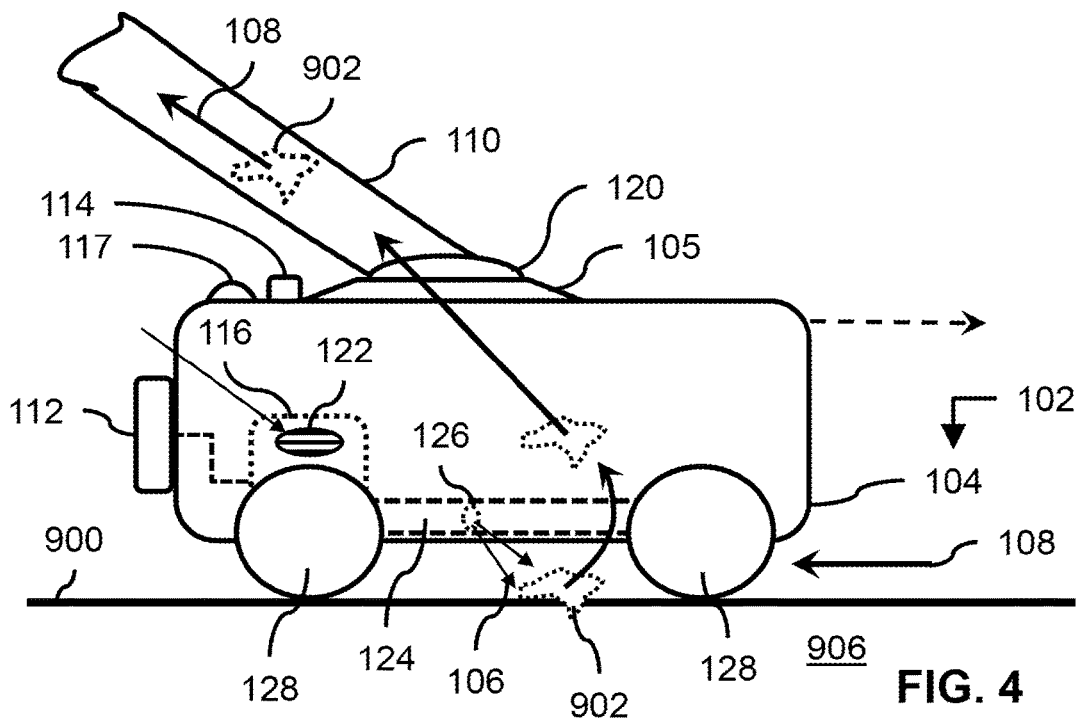

In accordance with the embodiment as depicted in FIG. 2, the lawn debris collection assembly 102 includes a plenum assembly 104. The plenum assembly 104 is configured to house (support) at least one instance of the positive air-pressure stream 106 and at least one instance of the negative air-pressure airstream 108; more specifically, the positive air-pressure stream 106 and the negative air-pressure airstream 108 are supported (are housed by the plenum assembly 104), as depicted in FIGS. 2 to 4, for instance. The plenum assembly 104 provides a protected space in which airstream flows (negative and positive) may be housed (contained), at least in part, so that the airflow streams are distributed or placed proximate to, at least in part, the lawn surface 900 of the lawn 906. For instance, the airstream flows may include a negative air-pressure stream and a positive air-pressure stream, or any number or instances of such streams, etc. The negative air-pressure airstream 108 (depicted in FIGS. 2 to 4, for instance) is an airflow stream that flows away from the lawn surface 900 (also called suction or vacuum). The positive air-pressure stream 106 (depicted in FIGS. 2 to 4, for instance) is an airflow stream that flows toward the lawn surface 900 (also called a positive air stream).

In accordance with an embodiment, the negative air-pressure airstream 108 and the positive air-pressure stream 106 may be operated at the same time (that is, in unison). In accordance with an alternative embodiment, the positive air-pressure stream 106 is operated without the negative air-pressure airstream 108, and then the negative air-pressure airstream 108 is operated without the positive air-pressure stream 106 (in an alternating manner, if so desired).

The negative air-pressure airstream 108 (as depicted in FIGS. 2, 3 and 4) are activated (either in unison or alternately), once the plenum assembly 104 is positioned relative to, or placed on, the lawn surface 900. This is done in such a way that the positive airstream flow has enough force (flow movement) to loosen and dislodge the lawn debris 902 (such as, small leaves, etc.) from the lawn surface 900, and the negative airflow stream has enough force (flow movement) to urge the lawn debris 902 (that was dislodged) into the debris-collection bag 908 (for collection of the lawn debris 902). In this manner, the lawn debris 902 is removed from the lawn surface 900 by the usage of the airstream flows that are formed in the plenum assembly 104. It will be appreciated that one of the airflows (such as, the negative pressure airflow) may be provided by the negative pressure generating assembly 118 (once actuated to do so). For instance, another one of the airflows (such as, the positive pressure airflow) is ejected from an air jet 126 (as depicted in FIGS. 2, 3 and 4, for instance), or at least one or more instances of the air jet 126, that is mounted to a lower section of the plenum assembly 104 (at a position that is proximate to the lawn surface 900). The air jet 126 is configured to direct the positive air-pressure stream 106 toward the lawn surface 900. The positive air-pressure stream 106 is configured to have sufficient force to separate and remove the lawn debris 902 (such as small leaves, etc.) from the lawn surface 900, and then the lawn debris 902 may be positioned in the negative air-pressure airstream 108 (provided by the negative pressure generating assembly 118). Then, the negative air-pressure airstream 108 removes the lawn debris 902 from the plenum assembly 104, through a wand unit 110, and to the negative pressure generating assembly 118, and then into the debris-collection bag 908. The wand unit 110 may include a rigid, hollow air-flow tube, etc.

In accordance with the embodiment as depicted in FIG. 1, the wand unit 110 includes an adaptor section 111 (interface section) configured to selectively couple to the wand unit 110 to an air intake of the negative pressure generating assembly 118. The plenum assembly 104 includes an upper tapered section 105, and the wand unit 110 is coupled to the upper tapered section 105. The upper tapered section 105 is configured to funnel the negative air-pressure airstream 108 into the wand unit 110. The plenum assembly 104 defines (provides) a debris entrance 103 configured to permit the plenum assembly 104 to be moved over the lawn debris 902 (such as, leaves).

Figure 5:
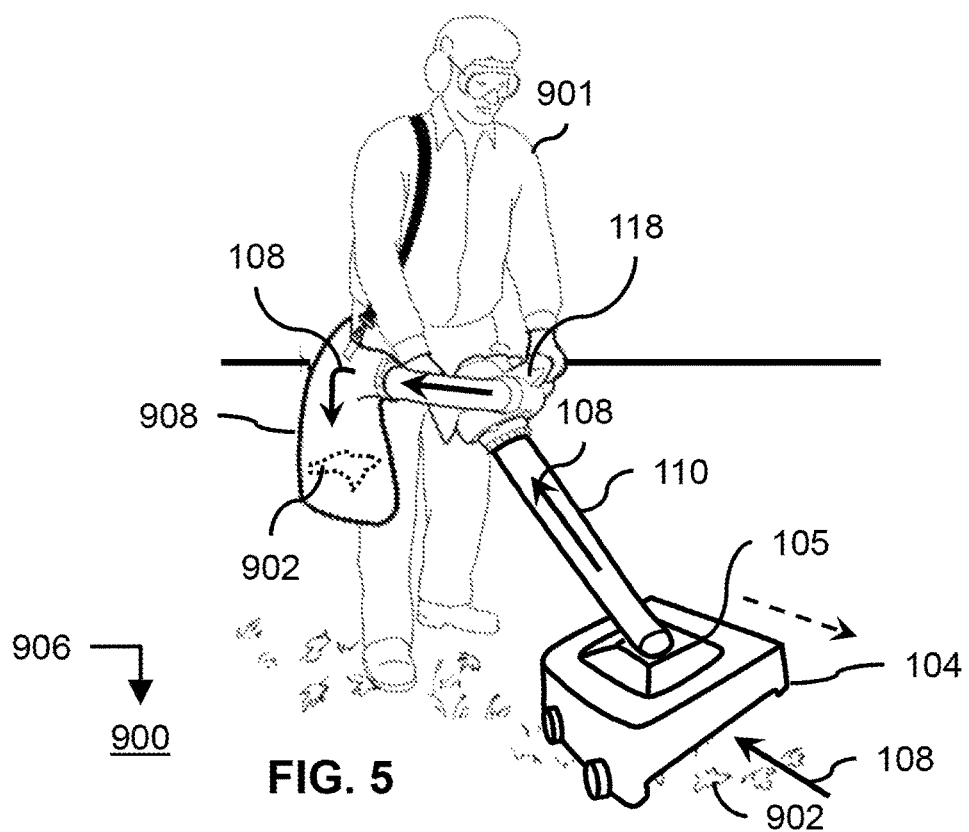

FIG. 2, FIG. 3, FIG. 4 and FIG. 5 depict views of embodiments of the apparatus of FIG. 1. FIG. 2 depicts a side view. FIG. 3 depicts a side view. FIG. 4 depicts a side view. FIG. 5 depicts a front perspective view.

In accordance with the embodiments as depicted in FIGS. 2, 3, 4 and 5, the apparatus includes (and is not limited to) a lawn debris collection assembly 102 including a plenum assembly 104. The plenum assembly 104 is configured to be positioned in close proximate relationship with the lawn surface 900 having the lawn debris 902 lodged between the lawn blades 904 (that is, grass blades) of the lawn 906. The plenum assembly 104 may be called a canister unit or a head unit.

In accordance with the embodiments as depicted in FIGS. 2, 3, 4 and 5, the plenum assembly 104 is movable along the lawn surface 900 once the plenum assembly 104 is positioned in close proximate relationship with the lawn surface 900. The plenum assembly 104 is configured to house a positive air-pressure stream 106. This is done in such a way that (A) the positive air-pressure stream 106 is directed toward the lawn debris 902 lodged between the lawn blades 904, and (B) the positive air-pressure stream 106 dislodges the lawn debris 902 from (away from) between the lawn blades 904 (once (i) the plenum assembly 104 is positioned proximate to the lawn debris 902 lodged between the lawn blades 904, and (ii) the positive air-pressure stream 106 is made to flow).

In accordance with the embodiments as depicted in FIGS. 2, 3, 4 and 5, the plenum assembly 104 is also configured to house a negative air-pressure airstream 108. This is done in such a way that (A) the negative air-pressure airstream 108 flows from the plenum assembly 104 to a debris-collection bag 908, and (B) the negative air-pressure airstream 108 urges the lawn debris 902, which was dislodged from between the lawn blades 904 by the positive air-pressure stream 106, to move from the plenum assembly 104 to the debris-collection bag 908. The debris-collection bag 908 may be called a bag, a collection container, etc.

This technical effect of the lawn debris collection assembly 102 is that there is, at least in part, an improvement of debris-collecting efficiency and/or a reduction of debris collecting time.

In accordance with an embodiment, the flow of the positive air-pressure stream 106 and the negative air-pressure airstream 108 are directed in such a way that relatively soon after the positive air-pressure stream 106 dislodges the lawn debris 902 from between the lawn blades 904 of the lawn 906, the negative air-pressure airstream 108 moves the lawn debris 902.

In accordance with the embodiments as depicted in FIGS. 2, 3, 4 and 5, the plenum assembly 104 is configured to selectively connect with a negative pressure generating assembly 118 having the debris-collection bag 908. The negative pressure generating assembly 118 is configured to urge movement of the negative air-pressure airstream 108 from the plenum assembly 104 to the debris-collection bag 908. This is done in such a way that the negative air-pressure airstream 108 moves along the lawn surface 900 and urges movement of the lawn debris 902, which was dislodged from between the lawn blades 904 by the positive air-pressure stream 106, from the plenum assembly 104 to the debris-collection bag 908 once (A) the plenum assembly 104 is operatively connected (directly or indirectly) to the negative pressure generating assembly 118, (B) the plenum assembly 104 is positioned proximate to the lawn surface 900, and (C) the positive air-pressure stream 106 and the negative air-pressure airstream 108 are urged to flow.

In accordance with the embodiments as depicted in FIGS. 2, 3, 4 and 5, the lawn debris collection assembly 102 further includes a positive pressure generating assembly 116. The positive pressure generating assembly 116 is supported by the plenum assembly 104. The positive pressure generating assembly 116 is positioned proximate to the lawn surface 900 (by the plenum assembly 104, or, more specifically, once the plenum assembly 104 is positioned proximate to the lawn surface 900). The positive pressure generating assembly 116 is configured to urge movement of the positive air-pressure stream 106 toward the lawn debris 902 lodged between the lawn blades 904. The negative air-pressure airstream 108 and the positive air-pressure stream 106 are each urged to flow within, and in close proximity to, the plenum assembly 104.

In accordance with the embodiments as depicted in FIGS. 2, 3, 4 and 5, the positive pressure generating assembly 116 is configured to urge movement of the positive air-pressure stream 106 toward the lawn blades 904 of the lawn 906. This is done in such a way that the positive air-pressure stream 106 urges the lawn blades 904 to separate and expose the lawn debris 902 to the positive air-pressure stream 106. The lawn debris 902 becomes dislodged by the positive air-pressure stream 106 and moves from (away from) between the lawn blades 904 once (A) the positive air-pressure stream 106 assembly is positioned proximate to the lawn blades 904, and (B) the positive air-pressure stream 106 is urged to flow.

In accordance with embodiment as depicted in FIG. 2, the lawn debris collection assembly 102 further includes a swivel connection 120. Generally, the swivel connection 120 is configured to couple (directly or indirectly) the wand unit 110 to the plenum assembly 104. More specifically, in accordance with an option, the swivel connection 120 is configured to couple to the wand unit 110 to the upper tapered section 105 that is provided by the plenum assembly 104. An embodiment of the swivel connection 120 is provided by the swivel connection described and disclosed in the ORECK (TRADEMARK) Model Number MC1000 Quest (TRADEMARK) Compact Canister system (and any equivalent thereof), and is incorporated herein by reference.

In accordance with the embodiment as depicted in FIG. 2, the lawn debris collection assembly 102 further includes an electrical power source assembly 112 (and any equivalent thereof). In accordance with an option, the electrical power source assembly 112 includes a removable 40-volt DC (Direct Current) rechargeable battery (known and not depicted, or any suitable sized battery) of the variety typically used in known residential lawn mowing equipment (known and not depicted). An embodiment of the residential lawn mowing equipment, which incorporates a rechargeable battery, includes the BLACK & DECKER (TRADEMARK) Model number CM1640 Cordless Lawn Mower, and any equivalent thereof, and is incorporated herein by reference.

In accordance with another option (as an alternative to the rechargeable battery), the electrical power source assembly 112 includes an electrical plug (known and not depicted) configured to receive operative connection with an electrical extension cord (known and not depicted) that is connected to an outdoor electrical plug (known and not depicted) of a house (building), if so desired. An embodiment of the residential lawn mowing equipment, which incorporates an electrical plug, includes the BLACK & DECKER Model number EM1500 Corded Electric Push Mower, and any equivalent thereof, and is incorporated herein by reference. In this manner, the plenum assembly 104 is powered by a 120 VAC (Volts Alternating Current) line that is connectable to a plug mounted to an outer wall of a building (house).

Referring to the embodiment as depicted in FIG. 2, the electrical power source assembly 112 is electrically connectable to the positive pressure generating assembly 116 in such a way that the electrical power source assembly 112 provides power to the positive pressure generating assembly 116.

In accordance with the embodiment as depicted in FIG. 2, the lawn debris collection assembly 102 further includes a switch assembly 114. The switch assembly 114 is electrically coupled to the electrical power source assembly 112 and the positive pressure generating assembly 116 (that is, electrically interposed between the electrical power source assembly 112 and the positive pressure generating assembly 116). The switch assembly 114 is configured to selectively connect and disconnect electrical power to and from the positive pressure generating assembly 116.

In accordance with the embodiment as depicted in FIG. 2, the lawn debris collection assembly 102 further includes a lamp assembly 117. The lamp assembly 117 is electrically coupled to the electrical power source assembly 112 and the positive pressure generating assembly 116 (that is, electrically interposed therebetween). This is done in such a way that when electrical power is delivered to the positive pressure generating assembly 116, the lamp assembly 117 is turned on, so that a visual indication may be provided to the user (that electrical power is being consumed by the positive pressure generating assembly 116).

In accordance with the embodiment as depicted in FIG. 2, the plenum assembly 104 defines (provides) an air intake 122. The air intake 122 is fluidly coupled to the positive pressure generating assembly 116. This is done in such a way that the positive pressure generating assembly 116 receives outside air (as an air intake). For instance, the positive pressure generating assembly 116 includes a fan unit or an air compressor, and any equivalent thereof.

In accordance with the embodiment as depicted in FIG. 2, the lawn debris collection assembly 102 further includes a positive air conduit 124 that is in fluid communication with (and extending from) the positive pressure generating assembly 116. Preferably, the positive air conduit 124 is positioned (at least in part) within the interior chamber of the plenum assembly 104.

In accordance with the embodiment as depicted in FIG. 2, the lawn debris collection assembly 102 further includes an air jet 126 (also called, an air nozzle, or at least one or more instances of the air jet 126) that is fluidly connected to the positive air conduit 124. This is done in such a way that the air jet 126 ejects (directs) the positive air-pressure stream 106 towards the lawn surface 900. The positive pressure generating assembly 116 is configured to generate the positive air-pressure stream 106 (to be delivered via the positive air conduit 124 and then ejected from the air jet 126). The positive air-pressure stream 106 may dislodge and lift the lawn debris 902 (leaves) into the negative air-pressure airstream 108 (negative airstream flow) generated by the negative pressure generating assembly 118 (such as, any one of the embodiments of the leaf blower/vacuum systems as identified above).

In accordance with the embodiment as depicted in FIG. 2, the lawn debris collection assembly 102 further includes a wheel 128 (at least one or more instances of the wheel 128). The wheel 128 is rotatably connected to the plenum assembly 104 (to the sidewalls of the plenum assembly 104). The wheel 128 (wheels) is configured to facilitate the rolling movement of the plenum assembly 104 along the lawn surface 900 (for convenient positioning and movement of the plenum assembly 104).

In accordance with an alternative embodiment (not depicted), it will be appreciated that the source for the positive air-pressure stream 106 may be positioned outside of the plenum assembly 104, such as within the negative pressure generating assembly 118 as an alternative embodiment to the embodiment depicted in FIG. 4 (if so desired).

Operation

The user 901 selectively connects the lawn debris collection assembly 102 to the negative pressure generating assembly 118. The user 901 powers the negative pressure generating assembly 118 (to actuate the negative air-pressure airstream 108), and then actuates the positive air-pressure stream 106 (such as, powering ON the positive pressure generating assembly 116, such as a fan, etc.), so that both types of airstreams may flow in unison. Alternatively, the user 901 may temporarily stop the positive air-pressure stream 106 while using the negative air-pressure airstream 108, and then stop the negative air-pressure airstream 108 and then use the positive air-pressure stream 106 (in an alternating manner, if desired, to prolong the battery life while the lawn debris collection assembly 102 is operated). The user 901 moves the lawn debris collection assembly 102 over the lawn surface 900. The plenum assembly 104 collects the lawn debris 902 from the lawn surface 900 (once the airstreams are made to flow). Additional passes of the lawn debris collection assembly 102 may be necessary. The user 901 empties the debris-collection bag 908 when the debris-collection bag 908 becomes too heavy to carry or becomes full.

FIG. 6 depicts a front perspective view of an embodiment of the apparatus of FIG. 1.

In accordance with the embodiment as depicted in FIG. 6, the lawn debris collection assembly 102 further includes a handle portion 144 configured to be grabbed by the user 901. In addition, the wand unit 110 includes a flexible hose section 146 that connects the handle portion 144 to the negative pressure generating assembly 118 (if desired). Referring to FIG. 6, the user 901 is depicted as setting up the lawn debris collection assembly 102 (for use). The user 901 is not depicted as using the lawn debris collection assembly 102.

FIG. 7 depicts a rear perspective view of an embodiment of the apparatus of FIG. 1.

The plenum assembly 104 may be called a canister unit. The plenum assembly 104 is pulled or pushed (moved) over the lawn surface 900 on a set of wheels.

FIG. 8, FIG. 9, FIG. 10, FIG. 11 and FIG. 12 depict partial frontal perspective views of embodiments of the apparatus of FIG. 1.

Figure 8:
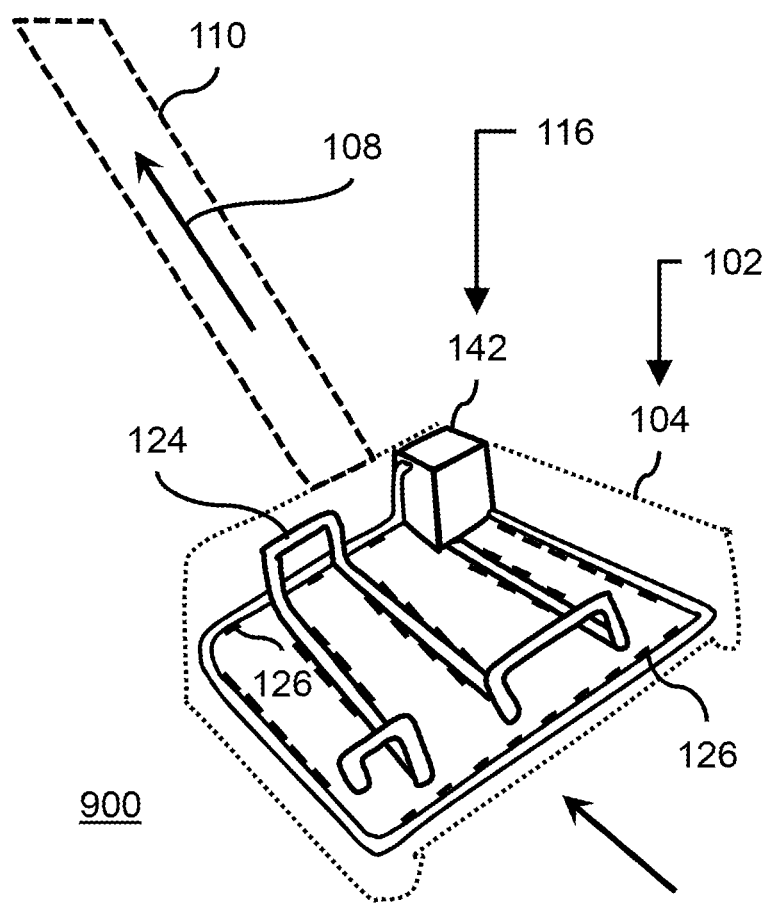
FIG. 8, FIG. 9, FIG. 10, FIG. 11 and FIG. 12 depict partial frontal perspective views of embodiments of the apparatus of FIG. 1.

In accordance with the embodiment as depicted in FIG. 8, the positive pressure generating assembly 116 further includes a fan unit 142 configured to urge the flow of air through the positive air conduit 124.

In accordance with an option, the positive air conduit 124 includes air pressure tubes configured to be changeable in layout, as may be desired by the user 901. The orientation of the air jet 126 may be changed at will by the user (if desired) to assist in adapting the lawn debris collection assembly 102 to suite the terrain, grass design, size of leaves, etc.

It will be appreciated that some maintenance of the positive air conduit 124 and the air jet 126 may be required from time to time. For instance, a relatively smaller diameter wire may be used to slide into and out of the positive air conduit 124 and/or the air jet 126. The end section of the positive air conduit 124 includes a cap or an air shutter (to close off the positive air conduit 124). The cap may be removed from the positive air conduit 124 so that any material clogged in the positive air conduit 124 may be removed or purged from the positive air conduit 124 (via the free end of the positive air conduit 124). The cap is replaced on the terminal end of the positive air conduit 124 in such a way that the cap closes (seals) the positive air conduit 124 (once maintenance is completed on the positive air conduit 124).

Figure 9:
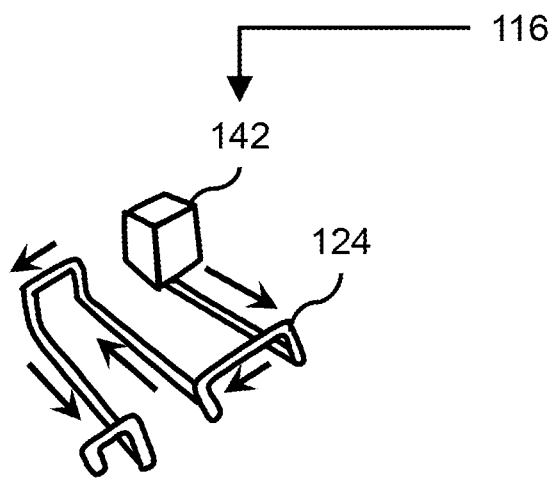

In accordance with the embodiment as depicted in FIG. 8 and FIG. 9, the positive air conduit 124 extends into the interior of the plenum assembly 104, between the opposite side walls of the plenum assembly 104 (as many times as may be desirable). The opposite side walls may include opposite lateral walls and/or opposite front and back walls, etc.

Figure 10:
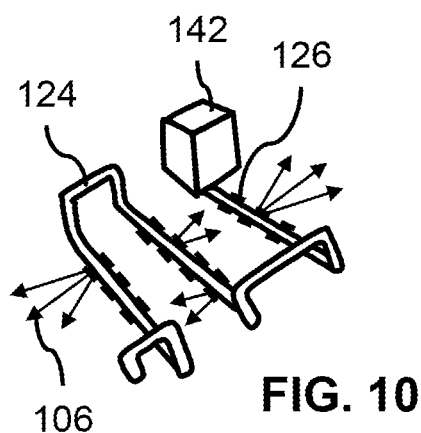

In accordance with the embodiment as depicted in FIG. 8 and FIG. 10, instances of the air jet 126 are positioned at predetermined positions along a length of the embodiment of positive air conduit 124 depicted in FIG. 9, preferably at positions located in the interior of the plenum assembly 104.

Figure 11:
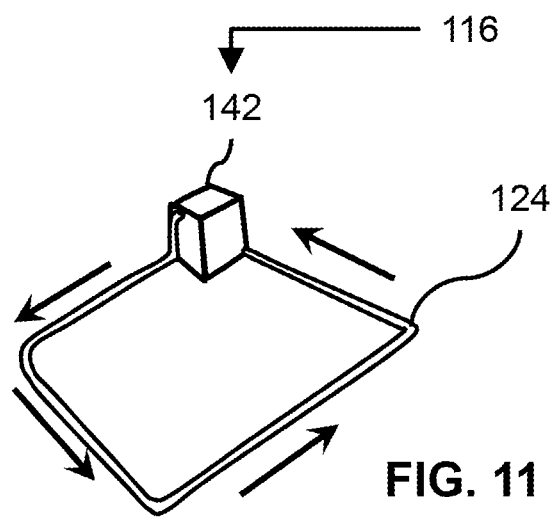

In accordance with the embodiment as depicted in FIG. 8 and FIG. 11, the positive air conduit 124 extends along the outer bottom peripheral section of the plenum assembly 104, along the bottom sections of the opposite side walls of the plenum assembly 104.

Figure 12:
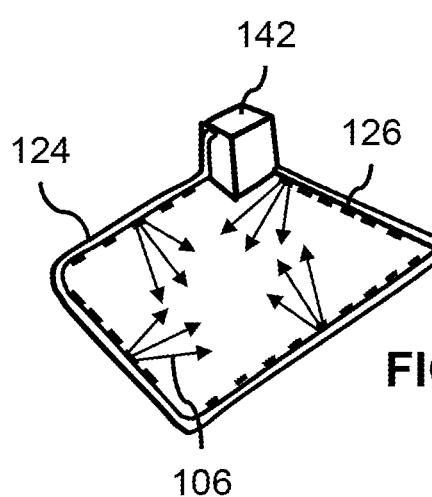

In accordance with the embodiment as depicted in FIG. 8 and FIG. 12, instances of the air jet 126 are positioned at predetermined positions along a length of the embodiment of positive air conduit 124 depicted in FIG. 11.

It will be appreciated that the embodiment depicted in FIG. 8 includes both of the embodiments of the positive air conduit 124 and the air jet 126 as depicted in FIGS. 10 and 12.

FIG. 13 and FIG. 14 depict rear views of embodiments of the apparatus of FIG. 1.

In accordance with an embodiment as depicted in FIG. 13, the lawn debris collection assembly 102 further includes a height-adjustment mechanism 130 configured to adjust the height of the positive air conduit 124 relative to the lawn surface 900. An embodiment of the height-adjustment mechanism 130 (also called a lawn-mower height adjustment system) is described and disclosed in U.S. Pat. No. 5,259,175 (inventor: Larry W. Schmidt; publication date: Nov. 9, 1993), and any equivalent thereof, and is incorporated by reference.

FIG. 15, FIG. 16 and FIG. 17 depict front views of embodiments of the apparatus of FIG. 1.

In accordance with the embodiment as depicted in FIG. 15, the plenum assembly 104 further includes a skirt assembly 140 that extends downwardly from the plenum assembly 104 from the opposite lateral sides of the plenum assembly 104 and from the rear side of the plenum assembly 104. Preferably, the skirt assembly 140 does not extend downwardly from a front side of the plenum assembly 104. The skirt assembly 140 is configured to enhance suction in the interior of the plenum assembly 104. In this manner, the lawn debris 902 enters the debris entrance 103 formed at the front side of the plenum assembly 104. The debris entrance 103 forms a horizontally elongated opening. The debris entrance 103 allows debris (leaves and grass, etc.) to pass through and into the interior of the plenum assembly 104 as the plenum assembly 104 is pushed or moved forwardly (by a user, for instance, or by other moving system, etc.).

It will be appreciated that in accordance with an option, the height of the plenum assembly 104 is fixed relative to the lawn surface 900. In accordance with another option, the height of the plenum assembly 104 is adjustable relative to the lawn surface 900 (height adjustment of the plenum assembly 104 accommodates relatively smaller sized debris or relatively larger sized debris). Adjusting the height of the plenum assembly 104 may maintain positive pressure and negative pressure occurring in the interior of the plenum assembly 104 while permitting the gathering of different sizes of debris. The height-adjustment mechanism 130 is configured to adjust the height of the debris entrance 103 to accommodate different sizes of the debris.

In accordance with the embodiment as depicted in FIG. 16, the lawn debris collection assembly 102 includes a rake profile 913 (as depicted in FIG. 16), which is known and not depicted, and may be positioned on, and extends downwardly from, from the plenum assembly 104. The rake profile extends in front of the debris entrance.

FIG. 18 depicts an internal view of an embodiment of the apparatus of FIG. 1.

In accordance with the embodiment as depicted in FIG. 18, the positive air conduit 124 provides or has (for instance and is not limited to) a triangular cross-sectional profile including flat face portions that face specific (predetermined) directions. The air jet 126, having a triangular cross-sectional profile, allows instances of the air jet 126 to be positioned at predetermined angles relative to the interior of the plenum assembly 104. The flat portions of the positive air conduit 124 permit easier connection of instances of the air jet 126 to the positive air conduit 124. For instance, a first flat face portion of the positive air conduit 124 faces the lawn surface 900 (and away from the plenum assembly 104), and a second flat face portion faces the interior of the plenum assembly 104 (and away from the lawn surface 900). For instance, a first instance of the air jet 126 is affixed to the first flat portion of the positive air conduit 124 (in such a way that the first instance of the air jet 126 faces the lawn surface 900 and away from the plenum assembly 104). A second instance of the air jet 126 is affixed to the second flat portion of the positive air conduit 124 (in such a way that the second instance of the air jet 126 faces the interior of the plenum assembly 104, and away from the lawn surface 900).

In operation, the first instance of the air jet 126 directs the positive air-pressure stream 106 toward the lawn debris 902 positioned on the lawn surface 900 in such a way that the positive air-pressure stream 106 dislodges the lawn debris 902 away from the lawn surface 900. Then, the negative air-pressure airstream 108 moves the lawn debris 902 into the interior of the plenum assembly 104. The second instance of the positive air-pressure stream 106 directs the positive air-pressure stream 106 toward the lawn debris 902 that is floating in the interior of the plenum assembly 104 in such a way that the positive air-pressure stream 106 moves (assists the movement of) the lawn debris 902 along with the negative air-pressure airstream 108 toward the wand unit 110 (so that the lawn debris 902 may exit the interior of the plenum assembly 104 and move into the wand unit 110, etc.).

It will be appreciated that person of skill in the art would understand that the spatial orientation of the instances of the air jet 126, and the heights of the positive air conduit 124, etc., can be adjusted and configured to achieve specific debris-removal effects (depending on the type of debris to be removed and the type of landscape to be cleaned). The triangular cross-section of the positive air conduit 124 is configured to provide lift assistance for propelling the lawn debris 902 along with the negative air-pressure airstream 108. It will be appreciated that in some situations, the instances of the air jet 126 point down and directly toward the lawn surface 900.

FIG. 19 depicts a side view of an embodiment of the apparatus of FIG. 1.

In accordance with the embodiment as depicted in FIG. 19, the swivel connection 120 is configured to pivotally move between a front section and a rear section of the plenum assembly 104. For instance, an embodiment of the swivel connection 120 includes a joint connection assembly, which is described and disclosed in the user's manual for the ORECK (TRADEMARK) QUEST (TRADEMARK) Model number MC1000 compact canister vacuum cleaner, and any equivalent thereof, and is incorporated herein by reference; the joint connection assembly is configured to connect a canister (which is similar to the plenum assembly 104) with a hollow vacuum tube (which is similar to the wand unit 110).

FIG. 20, FIG. 21, FIG. 22 and FIG. 23 depict a side view, a front view, a perspective view, and a perspective view (respectively) of embodiments of the apparatus of FIG. 1.

In accordance with the embodiments as depicted in FIGS. 20, 21, 22 and 23, the lawn debris collection assembly 102 further includes a slider assembly 136. The slider assembly 136 is an alternative to the instances of the wheel 128 that are depicted in previous FIGS. More specifically, two spaced-apart parallel instances of the slider assembly 136 are affixed to (mounted to) the bottom section of the plenum assembly 104. More specifically, the slider assembly 136 includes a canoe-shaped body having a cross section similar to a canoe, with blunted raised opposite end sections, and the canoe-shaped body provides an arched bottom portion (as opposed to a flat bottom portion).

Preferably, the slider assembly 136 is configured to keep the plenum assembly 104 at a buoyant position above the lawn surface (while the plenum assembly 104 is positioned on the lawn surface 900) without imparting damage to the lawn surface 900. Preferably, the slider assembly 136 forms an elongated continuous body positioned on opposite lateral sides of the plenum assembly 104. The slider assembly 136 is configured to avoid becoming tangled with the lawn surface 900 as the plenum assembly 104 is moved along the lawn surface 900. The slider assembly 136 is configured to facilitate a relatively easier sliding motion forward, backward and left and right.

Figure 21:
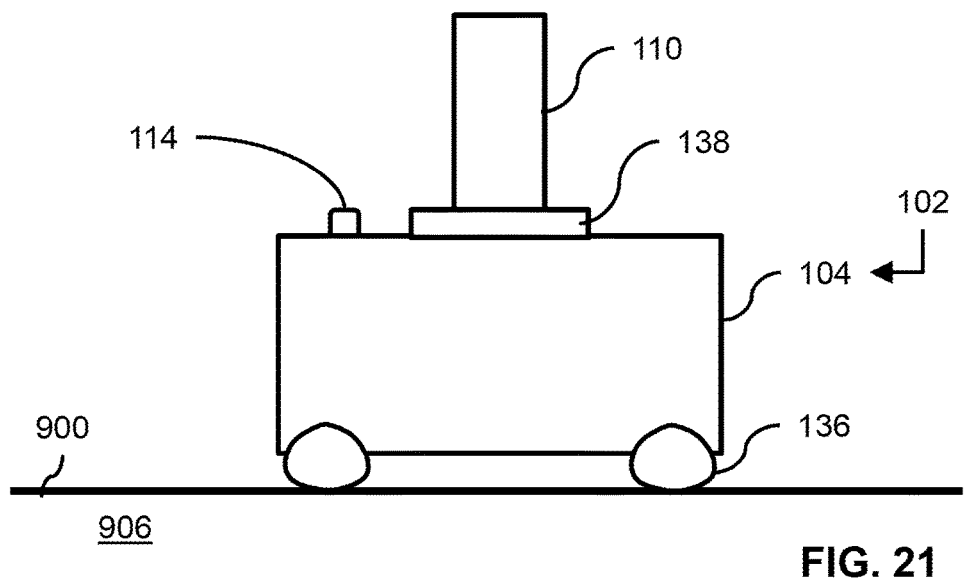
Figure 22:
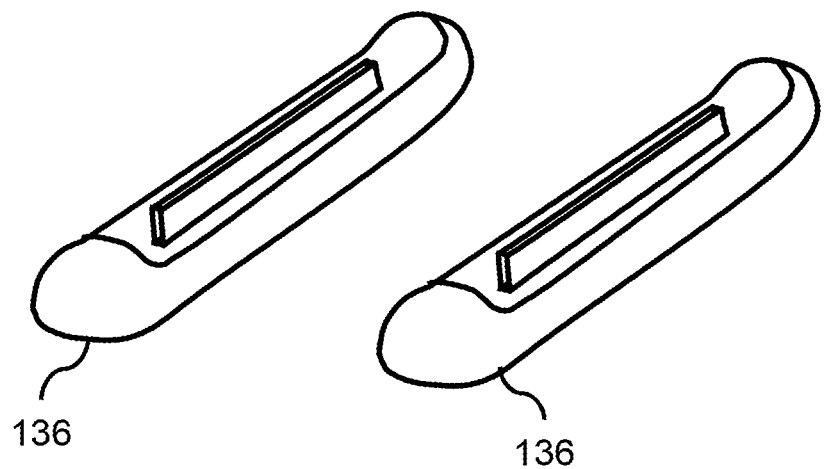
Figure 23:
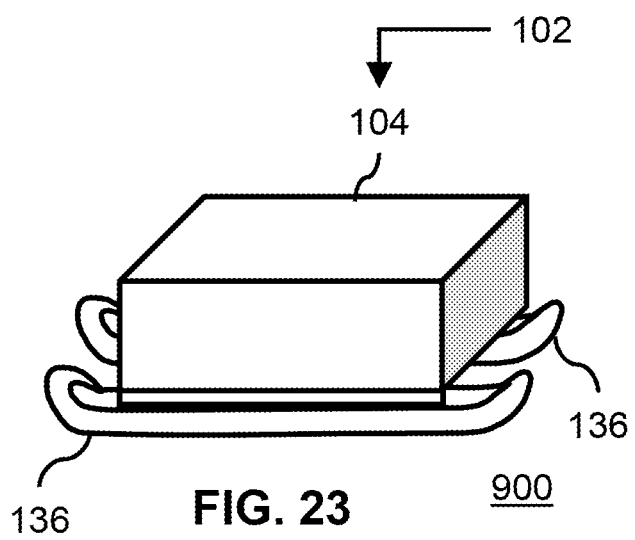

In accordance with the embodiment as depicted in FIG. 21, the lawn debris collection assembly 102 further includes a wand connection assembly 138. The wand connection assembly 138 is an alternative to deployment of the swivel connection 120 and the upper tapered section 105 that are depicted in previous FIGS. The wand connection assembly 138 is configured to fixedly connect the wand unit 110 to the plenum assembly 104 in such a way that the wand unit 110 extends at a fixed angle to the plenum assembly 104.

FIG. 24 depicts an electrical schematic of an embodiment of the apparatus of FIG. 1.

In accordance with the embodiment as depicted in FIG. 24, the lawn debris collection assembly 102 further includes an electrical circuit 148. The electrical circuit 148 is configured to convey electrical power to the positive pressure generating assembly 116 of the lawn debris collection assembly 102 (specifically, the positive pressure generating assembly 116 is mounted within the plenum assembly 104). The electrical circuit 148 is fixedly connected to and supported by the plenum assembly 104. The electrical circuit 148 includes (and is not limited to) the electrical power source assembly 112, the electrical terminals 132, the switch assembly 114, the fuse assembly 134 and the lamp assembly 117 (and wiring, and any equivalent thereof, used to electrically connect these components as depicted in FIG. 24). The electrical power source assembly 112 is electrically connected (selectively connected, either directly or indirectly, by electrical wire) to the electrical terminals 132. One of the electrical terminals 132 is electrically connected (by electrical wire) to the switch assembly 114. The other one of the electrical terminals 132 is electrically connected (by electrical wire) to the positive pressure generating assembly 116. The switch assembly 114 is electrically connected (by electrical wire) to the fuse assembly 134. The fuse assembly 134 is electrically connected (by electrical wire) to the lamp assembly 117. The lamp assembly 117 is electrically connected (by electrical wire) to the positive pressure generating assembly 116. Other components, such as a thermal-overload cut-off device (known and not depicted), may be installed in the electrical circuit 148, in which the thermal-overload cut-off device is configured to disconnect the positive pressure generating assembly 116 from the electrical power source assembly 112 for the case where the positive pressure generating assembly 116 becomes thermally overheated (for improved safety, etc.).

It will be appreciated that persons skilled in the art would know that technical features of each embodiment may be deployed (where possible) in other embodiments even if not expressly stated as such above.

It will be appreciated that persons skilled in the art would know that other options would be possible for the configuration of the components of the apparatus 100 (if so desired) to adjust to manufacturing requirements and still remain within the scope of the invention as described in at least one or more of the claims. This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims. It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
  a lawn debris collection assembly, including:
    a plenum assembly being configured to be positioned in close proximate relationship with a lawn surface having lawn debris lodged between lawn blades of a lawn; and
    the plenum assembly being movable along the lawn surface once the plenum assembly is positioned in close proximate relationship with the lawn surface; and
    the plenum assembly being configured to house a positive air-pressure stream in such a way that the positive air-pressure stream is directed toward the lawn debris lodged between the lawn blades, and the positive air-pressure stream, in use, dislodges the lawn debris away from between the lawn blades once:
      the plenum assembly is positioned proximate to the lawn debris lodged between the lawn blades; and
      the positive air-pressure stream is made to flow; and
    the plenum assembly also being configured to house a negative air-pressure airstream in such a way that the negative air-pressure airstream, in use, flows from the plenum assembly to a debris-collection bag once the negative pressure generating assembly, in use, is selectively connected to the debris-collection bag, and the negative air-pressure airstream, in use, urges the lawn debris, which was dislodged from between the lawn blades by the positive air-pressure stream, to move from the plenum assembly to the debris-collection bag; and
    wherein the plenum assembly defines a debris entrance forming a horizontally elongated opening, and the debris entrance is configured to allow the lawn debris to pass through and into the interior of the plenum assembly as the plenum assembly is moved forwardly.

2. The apparatus of claim 1, wherein:
  the plenum assembly is also configured to direct the flow of the positive air-pressure stream and the negative air-pressure airstream in such a way that relatively soon after the positive air-pressure stream, in use, dislodges the lawn debris from between the lawn blades of the lawn, the negative air-pressure airstream moves the lawn debris.

3. The apparatus of claim 1, wherein:
  the plenum assembly is configured to selectively connect with a negative pressure generating assembly having the debris-collection bag; and
  the negative pressure generating assembly is configured to urge movement of the negative air-pressure airstream from the plenum assembly to the debris-collection bag in such a way that the negative air-pressure airstream moves along the lawn surface and urges movement of the lawn debris, which was dislodged from between the lawn blades by the positive air-pressure stream, from the plenum assembly to the debris-collection bag once:
    the plenum assembly is operatively connected to the negative pressure generating assembly;
    the plenum assembly is positioned proximate to the lawn surface; and
    the positive air-pressure stream and the negative air-pressure airstream are urged to flow.

4. The apparatus of claim 3, wherein:
  the lawn debris collection assembly further includes:
    a positive pressure generating assembly being supported by the plenum assembly; and
    the positive pressure generating assembly being positioned proximate to the lawn surface by the plenum assembly once the plenum assembly is positioned proximate to the lawn surface; and
    the positive pressure generating assembly being configured to urge movement of the positive air-pressure stream toward the lawn debris lodged between the lawn blades; and
    wherein the negative air-pressure airstream and the positive air-pressure stream are each urged to flow within and in close proximity to the plenum assembly.

5. The apparatus of claim 4, wherein:
  the positive pressure generating assembly is configured to urge movement of the positive air-pressure stream toward the lawn blades of the lawn in such a way that the positive air-pressure stream, in use, urges the lawn blades to separate and expose the lawn debris to the positive air-pressure stream, and the lawn debris becomes dislodged by the positive air-pressure stream and moves away from between the lawn blades once:
    the positive pressure generating assembly is positioned proximate to the lawn blades; and
    the positive air-pressure stream is urged to flow.

6. The apparatus of claim 4, wherein:
  the lawn debris collection assembly further includes:
    an electrical power source assembly being electrically connectable to the positive pressure generating assembly in such a way that the electrical power source assembly provides power to the positive pressure generating assembly.

7. The apparatus of claim 4, wherein:
the plenum assembly defines an air intake that is fluidly coupled to the positive pressure generating assembly in such a way that the positive pressure generating assembly receives outside air.

8. The apparatus of claim 4, wherein:
the lawn debris collection assembly further includes:
an electrical circuit configured to convey electrical power to the positive pressure generating assembly of the lawn debris collection assembly; and
the electrical circuit is fixedly connected to and supported by the plenum assembly.

9. The apparatus of claim 4, wherein:
the lawn debris collection assembly further includes:
a positive air conduit that is in fluid communication with, and extends from, the positive pressure generating assembly.

10. The apparatus of claim 9, wherein:
the lawn debris collection assembly further includes:
an air jet that is fluidly connected to the positive air conduit in such a way that the air jet directs the positive air-pressure stream towards the lawn surface.

11. The apparatus of claim 9, wherein:
the positive pressure generating assembly includes:
a fan unit configured to urge flow of air through the positive air conduit.

12. The apparatus of claim 9, wherein:
the lawn debris collection assembly further includes:
a height-adjustment mechanism configured to adjust a height of the positive air conduit relative to the lawn surface.

13. The apparatus of claim 9, wherein:
the positive air conduit provides a triangular cross-sectional profile including flat face portions that face predetermined directions.

14. The apparatus of claim 1, wherein:
the lawn debris collection assembly further includes:
a wand unit; and
a swivel connection configured to couple the wand unit to the plenum assembly.

15. The apparatus of claim 1, wherein:
the lawn debris collection assembly further includes:
instances of a wheel that are rotatably connected to the plenum assembly, and configured to facilitate rolling movement of the plenum assembly along the lawn surface.

16. The apparatus of claim 1, wherein:
the plenum assembly further includes:
a skirt assembly that extends downwardly from the plenum assembly from opposite lateral sides of the plenum assembly and from the rear side of the plenum assembly; and
the skirt assembly is configured to enhance suction in the interior of the plenum assembly, and in this manner, the lawn debris enters the debris entrance formed at the front side of the plenum assembly.

17. The apparatus of claim 1, wherein:
the lawn debris collection assembly further includes:
a rake profile extending downwardly from the plenum assembly; and
the rake profile extending in front of the debris entrance.

18. The apparatus of claim 1, wherein:
the lawn debris collection assembly further includes:
spaced-apart parallel instances of a slider assembly that are affixed to a bottom section of the plenum assembly; and
the slider assembly is configured to keep the plenum assembly at a buoyant position above the lawn surface while the plenum assembly is positioned on the lawn surface without imparting damage to the lawn surface.

19. The apparatus of claim 1, wherein:
the lawn debris collection assembly further includes:
a wand unit; and
a wand connection assembly configured to fixedly connect the wand unit to the plenum assembly in such a way that the wand unit extends at a fixed angle to the plenum assembly.

20. An apparatus, comprising:
a lawn debris collection assembly, including:
a plenum assembly being configured to be positioned in close proximate relationship with a lawn surface having lawn debris lodged between lawn blades of a lawn; and
the plenum assembly being movable along the lawn surface once the plenum assembly is positioned in close proximate relationship with the lawn surface; and
the plenum assembly being configured to house a positive air-pressure stream in such a way that the positive air-pressure stream is directed toward the lawn debris lodged between the lawn blades, and the positive air-pressure stream, in use, dislodges the lawn debris away from between the lawn blades once:
the plenum assembly is positioned proximate to the lawn debris lodged between the lawn blades; and
the positive air-pressure stream is made to flow; and
the plenum assembly also being configured to house a negative air-pressure airstream in such a way that the negative air-pressure airstream, in use, flows from the plenum assembly to a debris-collection bag once the negative pressure generating assembly, in use, is selectively connected to the debris-collection bag, and the negative air-pressure airstream, in use, urges the lawn debris, which was dislodged from between the lawn blades by the positive air-pressure stream, to move from the plenum assembly to the debris-collection bag; and
wherein:
the plenum assembly is configured to selectively connect with a negative pressure generating assembly having the debris-collection bag; and
the negative pressure generating assembly is configured to urge movement of the negative air-pressure airstream from the plenum assembly to the debris-collection bag in such a way that the negative air-pressure airstream moves along the lawn surface and urges movement of the lawn debris, which was dislodged from between the lawn blades by the positive air-pressure stream, from the plenum assembly to the debris-collection bag once:
the plenum assembly is operatively connected to the negative pressure generating assembly;
the plenum assembly is positioned proximate to the lawn surface; and
the positive air-pressure stream and the negative air-pressure airstream are urged to flow; and the lawn debris collection assembly further includes:
  a positive pressure generating assembly being supported by the plenum assembly; and
  the positive pressure generating assembly being positioned proximate to the lawn surface by the plenum assembly once the plenum assembly is positioned proximate to the lawn surface; and
  the positive pressure generating assembly being configured to urge movement of the positive air-pressure stream toward the lawn debris lodged between the lawn blades; and
  the negative air-pressure airstream and the positive air-pressure stream are each urged to flow within and in close proximity to the plenum assembly; and
the lawn debris collection assembly further includes:
  a positive air conduit that is in fluid communication with, and extends from, the positive pressure generating assembly; and
  the positive air conduit provides a triangular cross-sectional profile including flat face portions that face predetermined directions.

\* \* \* \* \*